US008953191B2

(12) United States Patent
Fukuda

(10) Patent No.: US 8,953,191 B2
(45) Date of Patent: Feb. 10, 2015

(54) DOCUMENT MANAGEMENT SYSTEM

(75) Inventor: Naoyuki Fukuda, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 13/216,974

(22) Filed: Aug. 24, 2011

(65) Prior Publication Data

US 2012/0050806 A1 Mar. 1, 2012

(30) Foreign Application Priority Data

Sep. 1, 2010 (JP) .................................. 2010-196006
May 31, 2011 (JP) .................................. 2011-121617

(51) Int. Cl.
*G06F 3/12* (2006.01)
*G06F 17/30* (2006.01)
*H04N 1/00* (2006.01)
*H04N 1/32* (2006.01)

(52) U.S. Cl.
CPC ...... *G06F 17/30011* (2013.01); *H04N 1/00244* (2013.01); *H04N 1/32101* (2013.01); *H04N 2201/3245* (2013.01); *H04N 2201/325* (2013.01); *H04N 2201/0039* (2013.01); *H04N 2201/0094* (2013.01); *H04N 2201/3274* (2013.01)

USPC ......... 358/1.14; 358/1.16; 707/781; 707/784; 707/796; 715/229

(58) Field of Classification Search
None
See application file for complete search history.

(56) References Cited

U.S. PATENT DOCUMENTS

| 7,222,131 | B1 * | 5/2007 | Grewal et al. ................. 717/168 |
| 7,532,340 | B2 * | 5/2009 | Koppich et al. .............. 358/1.15 |
| 2003/0016381 | A1 * | 1/2003 | Taniguchi .................... 358/1.15 |
| 2007/0233687 | A1 * | 10/2007 | Iwase ................................ 707/9 |
| 2008/0080017 | A1 * | 4/2008 | Ishizuka et al. ............... 358/452 |

FOREIGN PATENT DOCUMENTS

JP 2009-277113 A 11/2009

* cited by examiner

*Primary Examiner* — Mark Zimmerman
*Assistant Examiner* — Lawrence Wills
(74) *Attorney, Agent, or Firm* — Fitzpatrick, Cella, Harper & Scinto

(57) ABSTRACT

An image processing apparatus displays a list of document data managed by a document management system, checks-out the document data selected from the list, and prints it. When a check-in is performed, a print document is scanned and scan data obtained by the scan is checked-in to the document management system.

17 Claims, 11 Drawing Sheets

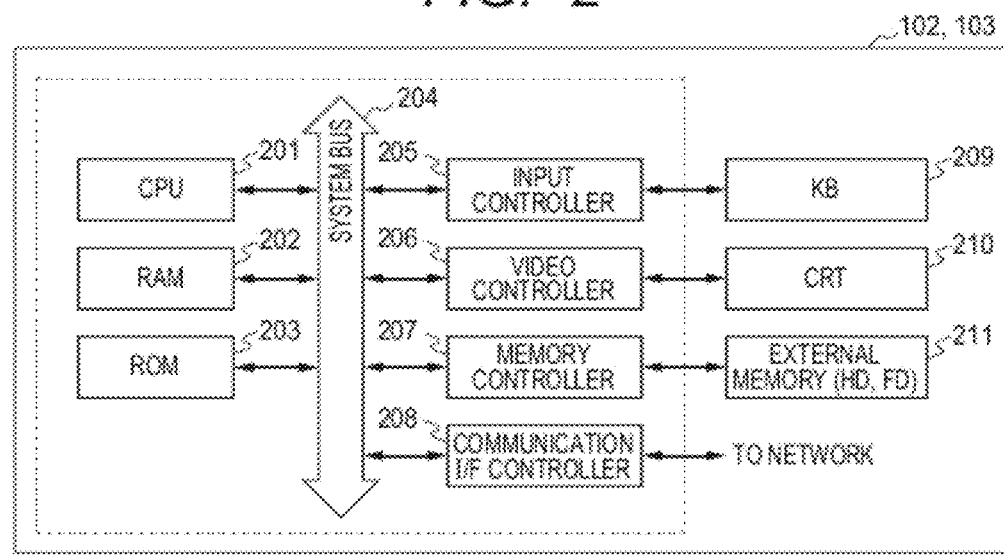
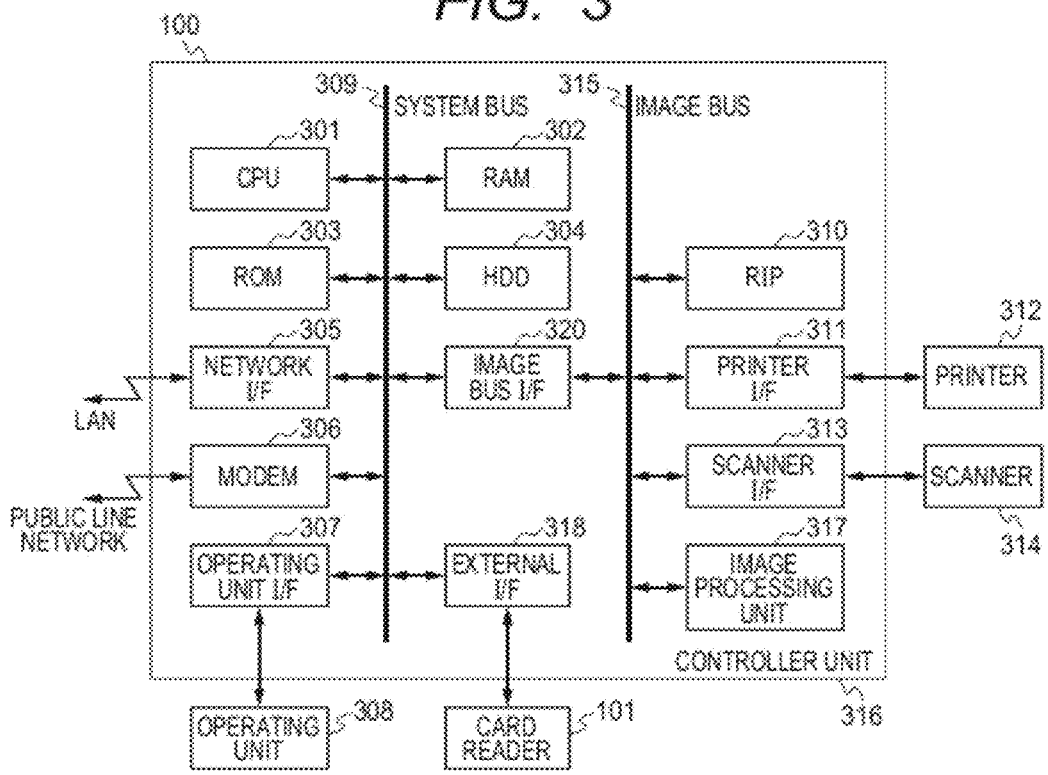

FIG. 9

| | | |
|---|---|---|
| 901 | UserID | 001 |
| 902 | DeviceID | fukuda@device.com |
| 903 | DocSystemID | fukuda@docsystem.com |
| 904 | DocSystemPwd | hoge |

| | | |
|---|---|---|
| 1001 | DocID | DOC001 |
| 1002 | DocServerName | doc.com |
| 1003 | DocFile | <BINARY> |
| 1004 | DocFileName | hoge.pdf |
| 1005 | HandleUserID | 001 |
| 1006 | CreateDate | 2010-08-06 |
| 1007 | CreateTime | 20:10:20 |
| 1008 | File Path | XXXXXXXXXXXXXXXX |
| 1009 | CheckOutFlug | 0 |

| | | |
|---|---|---|
| 1101 | DocID | DOC001 |
| 1102 | DocFileName | hoge.pdf |
| 1103 | DocFile | <BINARY> |
| 1104 | OwnerID | fukuda@docsystem.com |
| 1105 | Create | 2010-08-06 19:20:30 |
| 1106 | Update | 2010-08-06 19:30:40 |
| 1107 | CheckOutFlag | 1 |
| 1108 | Version | 1.3 |
| 1109 | 1stVersion | <BINARY> |
| 1110 | Last2Version | <BINARY> |
| 1111 | Last1Version | <BINARY> |
| 1112 | File Path | XXXXXXXXXXXXXX |

| | | |
|---|---|---|
| 1201 | USER ID | fukuda@device.com |
| 1202 | IC CARD ID | 0123456789ABCDEF |
| 1203 | ADMINISTRATOR FLAG | 0 |

1200

| | | |
|---|---|---|
| 1211 | USER ID | fukuda@device.com |
| 1212 | IC CARD ID | 0123456789ABCDEF |

1210

DOCUMENT MANAGEMENT SYSTEM

BACKGROUND OF THE INVENTION

1. Field of the Invention

The present invention relates to a document management system.

2. Description of the Related Art

In recent years, a document management system in which document data obtained by converting a document into electronic data is stored into a server computer and managed has been used in an enterprise or the like. The general document management system has a version managing function and makes version management of the document by combining a check-out (locking) function and a check-in (updating) function to the document data. A text file and application files are included in the document data serving as a management target in the document management system. Typically, a PDF file, an Office file of Microsoft Corporation, and the like are included in the application files.

Ordinarily, in the case of updating the version of the document data, the user accesses a server of the document management system by using a PC terminal of the user of the document management system, downloads a file which he wants to update its version, and performs a check-out. In the PC terminal, after the file was edited, the edited file is checked-in, thereby storing it as a file of a new version into a document management server. In this manner, the file which is managed by the document management server is checked-out and checked-in by using the PC terminal.

In the case of accessing the document management system from the PC terminal and updating the version of the document data such as a PDF file or the like, if the system has applications only for browsing, an edition cannot be performed in the PC. In such a case, it is considered that the version is updated by the following procedure.

1. The document data of the document management system is opened by the PC (check-out).
2. The document data is output by a printer and obtained.
3. An edition (hand-writing, paper insertion, or the like) is performed to an output matter.
4. The edited paper is read by a scanner and converted into electronic data, and the data is sent to the PC.
5. A file obtained by converting into the electronic data by the PC is uploaded to the document management system and the version is updated (check-in).

According to a technique disclosed in Japanese Patent Application Laid-open No. 2009-277113, the following invention is disclosed. That is, when a document which is desired to be approved is uploaded from the PC terminal to the document management server, E-mail for an approval request is transmitted from the document management server to an approver (a superior or the like having an approval authority) and a person who received the approval request moves to a place where a multifunction apparatus has been installed and outputs the document. The approver makes a signature to an approval position, scans the document, uploads the document to the server, and performs a check-in (updating).

According to the document management system disclosed in Japanese Patent Application Laid-open No. 2009-277113, a point that when the document data is checked-out and output, a background pattern is removed from the approval position is disclosed. However, since the user needs to move among the PC terminal, printer, and scanner (multifunction apparatus in Japanese Patent Application Laid-open No. 2009-277113) and to execute the PC operation and the like, there is such a problem that a working efficiency is low.

SUMMARY OF THE INVENTION

In order to solve the above problems, the present invention provides a document management system including an information processing apparatus for communication with a document management apparatus which stores document data, and further including an image processing apparatus having a print unit for printing the document data and a display unit. The image processing apparatus comprises: a document list display unit that displays a list of the document data stored in the document management apparatus onto the display unit; a check-out document selection accepting unit that accepts, through the display unit, a selection of the document data to be checked-out from the document data displayed by the document list display unit; a print executing unit that receives the document data accepted by the check-out document selection accepting unit from the information processing apparatus and prints a document through the print unit; a check-in instruction accepting unit that accepts, through the display unit, a check-in instruction for updating the checked-out document data; a scan executing unit that executes a scan of the document printed by the print executing unit so as to update the document data in which the check-in instruction has been accepted by the check-in instruction accepting unit; and a scan data transmitting unit that transmits information for specifying the document data in which the check-in has been instructed by the check-in instruction accepting unit and scan data obtained by executing the scan by the scan executing unit to the information processing apparatus. The information processing apparatus comprises: a check-out discriminating unit that discriminates whether or not the document data accepted by the check-out document selection accepting unit of the image processing apparatus is in a check-out state; a check-out unit that checks-out the document data when it is determined by the check-out discriminating unit that the document data is not in the check-out state; an output instructing unit that issues an output instruction to the image processing apparatus so as to print the document data checked-out by the check-out unit; an uploading unit that transmits the scan data transmitted by the scan data transmitting unit of the image processing apparatus to the document management apparatus together with the information for specifying the document data to be checked-in; and a check-in unit that checks-in the document data which has completely been uploaded into the document management apparatus by the uploading unit.

According to the aspect of the invention, an access to the document management system is realized by the operation on the image processing apparatus side and a working efficiency in the editing operation of a document can be improved.

Further features of the present invention will become apparent from the following description of exemplary embodiments with reference to the attached drawings.

BRIEF DESCRIPTION OF THE DRAWINGS

FIG. 2 is a diagram illustrating a construction of hardware of various kinds of terminals in the embodiment of the invention.

FIG. 3 is a diagram illustrating a construction of hardware of various kinds of terminals in the embodiment of the invention.

FIG. 9 is a diagram illustrating a table layout of a fundamental database in the embodiment of the invention.

FIG. 10 is a diagram illustrating a table layout of a fundamental database in the embodiment of the invention.

FIG. 11 is a diagram illustrating a table layout of a fundamental database in the embodiment of the invention.

FIG. 12 is a diagram illustrating a table layout of a fundamental database in the embodiment of the invention.

DESCRIPTION OF THE EMBODIMENTS

Figure 1:
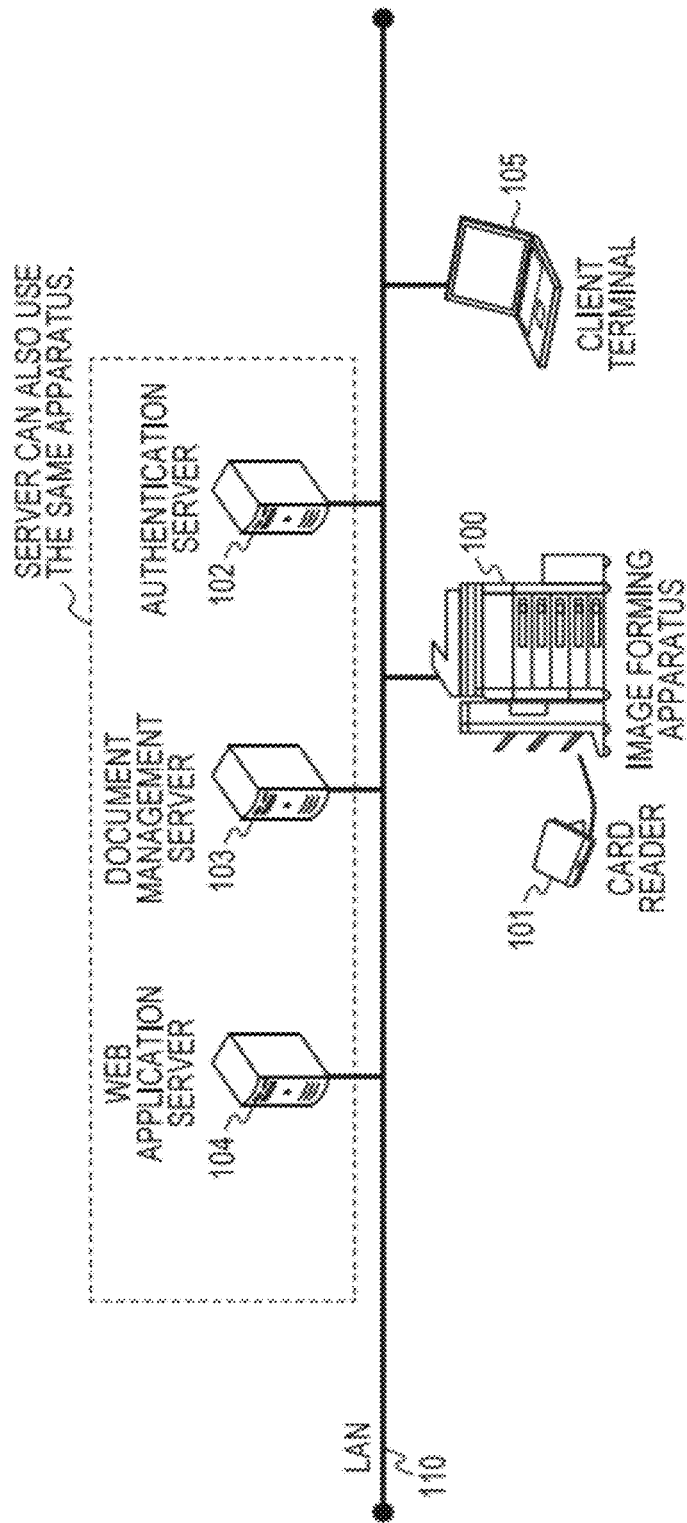
FIG. 1 is a diagram illustrating a fundamental network construction in an embodiment of the invention.

A method of checking-out and checking-in a document in a document management system of the invention will be described hereinbelow with reference to the drawings. FIG. 1 is a diagram schematically illustrating a construction of the document management system of the invention.

In the document management system of the invention, an image forming apparatus 100, an authentication server 102, a document management server 103, a Web application server 104, and a client PC 105 are connected in a standby state where they can communicate with each other on a local area network (LAN) 110. A card reader 101 is connected to the image forming apparatus 100.

In the document management system of the invention, the image forming apparatus 100 executes a check-out and printing of document data obtained from the document management server 103 and such a process that a scan image which is obtained by scanning a print document is uploaded to the document management server and checked-in.

The authentication server 102 stores an authentication database for performing a log-in to the document management system of the invention and executes an authentication of the user who makes a log-in to the image forming apparatus 100.

The document management server 103 is a server of an enterprise or a division use represented by, for example, MOSS (Microsoft Office Share Point Server) (registered trademark) of Microsoft Corporation in U.S.A. in which information in an organization is organized, the totalizing operations are summarized to a Web-base application at one position, and a data analysis of the organization is realized.

Although the authentication server 102, document management server 103, and Web application server 104 are constructed by independent casings in the diagram, they can be also constructed as one server having their functions.

Subsequently, a hardware construction of each server which can be applied to the authentication server 102, document management server 103, and Web application server 104 illustrated in FIG. 1 will be described with reference to FIG. 2. FIG. 2 is a block diagram illustrating a hardware construction of an information processing apparatus which can be applied to the client terminal, management server, and authentication server illustrated in FIG. 1.

In FIG. 2, a CPU 201 totally controls each device and a controller which are connected to a system bus 204. A BIOS (Basic Input/Output System) or an operating system program (hereinbelow, OS) serving as a control program of the CPU 201, various kinds of programs which are necessary to realize functions that are executed by the respective servers or each PC and will be described hereinafter, and the like have been stored in a ROM 202 or an external memory 211.

A RAM 203 functions as a main memory, a work area, or the like of the CPU 201. The CPU 201 reads out the program or the like which is necessary to execute processes from the ROM 202 or external memory 211, loads it into a RAM 203, and executes the loaded program, thereby realizing various kinds of operations.

An input controller 205 controls an input from a pointing device such as keyboard (KB) 209 or mouse (not shown) or the like. A video controller 206 controls a display onto a display such as a CRT display (CRT) 210 or the like. Although the CRT 210 is illustrated in FIG. 2, the display is not limited only to the CRT but may be another display such as a liquid crystal display or the like. The administrator selectively uses them in accordance with necessity.

A memory controller 207 controls an access to the external memory 211 such as hard disk (HD) in which a boot program, various kinds of applications, font data, a user file, an editing file, various kinds of data, and the like have been stored, flexible disk (FD), compact flash (registered trademark) memory which is connected to a PCMCIA card slot through an adaptor, or the like.

A communication I/F controller 208 is connected to and communicates with an external apparatus through a network (for example, LAN 110 illustrated in FIG. 1), and executes a communication control process via the network. For example, communication using a TCP/IP or the like can be made.

By executing a process for developing (rasterizing) an outline font into a display information area in the RAM 203, the CPU 201 enables a display on the CRT 210. The CPU 201 also enables the user to instruct by using a mouse cursor or the like (not shown) on the CRT 210.

Processes of respective steps which will be described hereinafter by flowcharts which are executed by the image forming apparatus 100, authentication server 102, document management server 103, and Web application server 104 in FIGS. 6 to 8 for realizing the invention are executed by a program which can be read out and executed by a computer. The program has been recorded in the external memory 211. The program is loaded into the RAM 203 in accordance with the necessity and is executed by the CPU 201. Further, a definition file which is used at the time of execution of the program, various kinds of information tables, and the like have also been stored in the external memory 211. They will be also described in detail hereinafter.

Subsequently, the hardware construction of the image forming apparatus 100 illustrated in FIG. 1 will be described with reference to FIG. 3. FIG. 3 is a block diagram illustrating an example of the hardware construction of the image forming apparatus 100 illustrated in FIG. 1.

In FIG. 3, a controller unit 316 is connected to a scanner 314 which functions as an image input device and a printer unit 312 which functions as an image output device. The controller unit 316 is also connected to a LAN (for example, LAN 110 illustrated in FIG. 1) or a public line (WAN) (for example, PSTN, ISDN, or the like), thereby inputting and outputting image data and device information.

In the controller unit 316, a CPU 301 is a processor for controlling the whole system. A RAM 302 is a system work memory for making the CPU 301 operative and is also a program memory for recording the program or an image memory for temporarily recording the image data.

The boot program of the system and various kinds of control programs have been stored in a ROM 303. A hard disk drive (HDD) 304 stores the various kinds of programs for controlling the system, image data, and the like.

An operating unit interface (operating unit I/F) 307 is an interface unit with an operating unit (keyboard) 308. The operating unit I/F 307 also plays a role of transferring key information (for example, depression of a start button) which was input from the operating unit 308 to the CPU 301.

A network interface (Network I/F) 305 is connected to the network (LAN) 110, thereby inputting and outputting data. A modem (MODEM) 306 is connected to the public line, thereby performing data input and output such as transmission and reception via a facsimile apparatus (FAX) or the like.

An external interface (external I/F) 318 is an I/F unit for receiving an external input such as USB, IEEE1394, printer port, RS-232C, or the like. In the embodiment, the card reader 101 for reading an IC card (recording medium) of a cellular phone which is necessary upon authentication is connected to the external I/F unit 318. Through the external I/F 318, the CPU 301 controls the reading of information from the IC card of the cellular phone by the card reader 101 and can obtain the information read out of the IC card of the cellular phone. The above devices are arranged on a system bus 309.

An image bus interface (image bus I/F) 320 is a bus bridge for connecting the system bus 309 and an image bus 315 for transferring the image data at a high speed and converting a data structure. The image bus 315 is constructed by a PCI bus or IEEE1394. The following devices are connected onto the image bus 315.

A raster image processor (RIP) 310 develops, for example, vector data such as a PDL code or the like into a bitmap image. A printer interface (printer I/F) 311 connects the printer unit 312 and the controller unit 316 and performs a conversion of the synchronous system/asynchronous system of the image data. A scanner interface (scanner I/F) 313 connects the scanner 314 and the controller unit 316 and performs a conversion of the synchronous system/asynchronous system of the image data.

An image processing unit 317 executes a correction, a modification, and an edition to the input image data and performs a correction, a resolution conversion, and the like of the printer to print output image data. In addition to them, the image processing unit 317 executes a rotation of the image data, executes a compressing/decompressing process of JPEG to multivalue image data, and executes a compressing/decompressing process of JBIG, MMR, MH, or the like to binary image data, respectively. The image processing unit 317 drives the scanner unit 314, processes the image data of the read image, converts into a format (for example, PDF format file) in which the image data can be output as a file, and can transmit the file of the image data to an external apparatus through the network I/F 305 in association with the CPU 301.

The scanner unit 314 illuminates the image on paper serving as an original and scans it by a CCD line sensor, thereby converting the scanned image into an electric signal as raster image data. The original sheets are set onto a tray of an original feeder. The user of the apparatus instructs to activate the reading from the operating unit 308, so that the CPU 301 issues an instruction to the scanner 314, the feeder feeds the original sheets one by one, and the reading operation of the original image is executed.

The printer unit 312 is a portion for converting the raster image data into the image on the sheet. As a converting method, there is an electrophotographic system using a photosensitive drum and a photosensitive belt, an ink jet system in which ink is emitted from a micronozzle array and an image is directly printed onto the sheet, or the like. Any one of those systems may be used. The activation of the printing operation is started by an instruction from the CPU 301. The printer unit 312 has a plurality of sheet feeding stages so that different sheet sizes or different orientations of the sheets can be selected and there are sheet cassettes corresponding to those stages.

The operating unit 308 has an LCD display unit. A touch panel sheet is adhered onto the LCD. An operating display screen of the system is displayed on the display unit. When an arbitrary one of displayed keys is depressed, the operating unit 308 transmits information of the position corresponding to the depressed key to the CPU 301 through the operating unit I/F 307. The operating unit 308 has, for example, a start key, a stop key, an ID key, a reset key, and the like as various kinds of operation keys.

Display performance of the display unit differs depending on the printer. The invention is constructed by a printer which can be operated through the touch panel and a printer which has a liquid crystal display screen and merely displays a character string (a print state and a name of a document which is being printed are displayed).

The start key in the operating unit 308 is used when starting the reading operation of the original image or the like. LEDs of two colors of green and red are arranged in a center portion of the start key. Whether or not the start key is in a ready state is shown by the color. The stop key in the operating unit 308 is used to stop the operation which is being executed. The ID key in the operating unit 308 is used when inputting a user ID of the user. The reset key is used to initialize the settings from the operating unit.

The card reader 101 reads information stored in the IC card held in the cellular phone and notifies the CPU 301 of the read information through the external I/F unit 318 under control of the CPU 301.

By the construction as mentioned above, the printer 312 can transmit the image data read by the scanner 314 onto the LAN 110 and print and output print data received from the LAN 110 by the printer unit 312.

The image data read by the scanner 314 can be also transmitted via the FAX onto the public line by the modem 306 or the image data received via the FAX from the public line can be also output by the printer unit 312.

Figure 4:
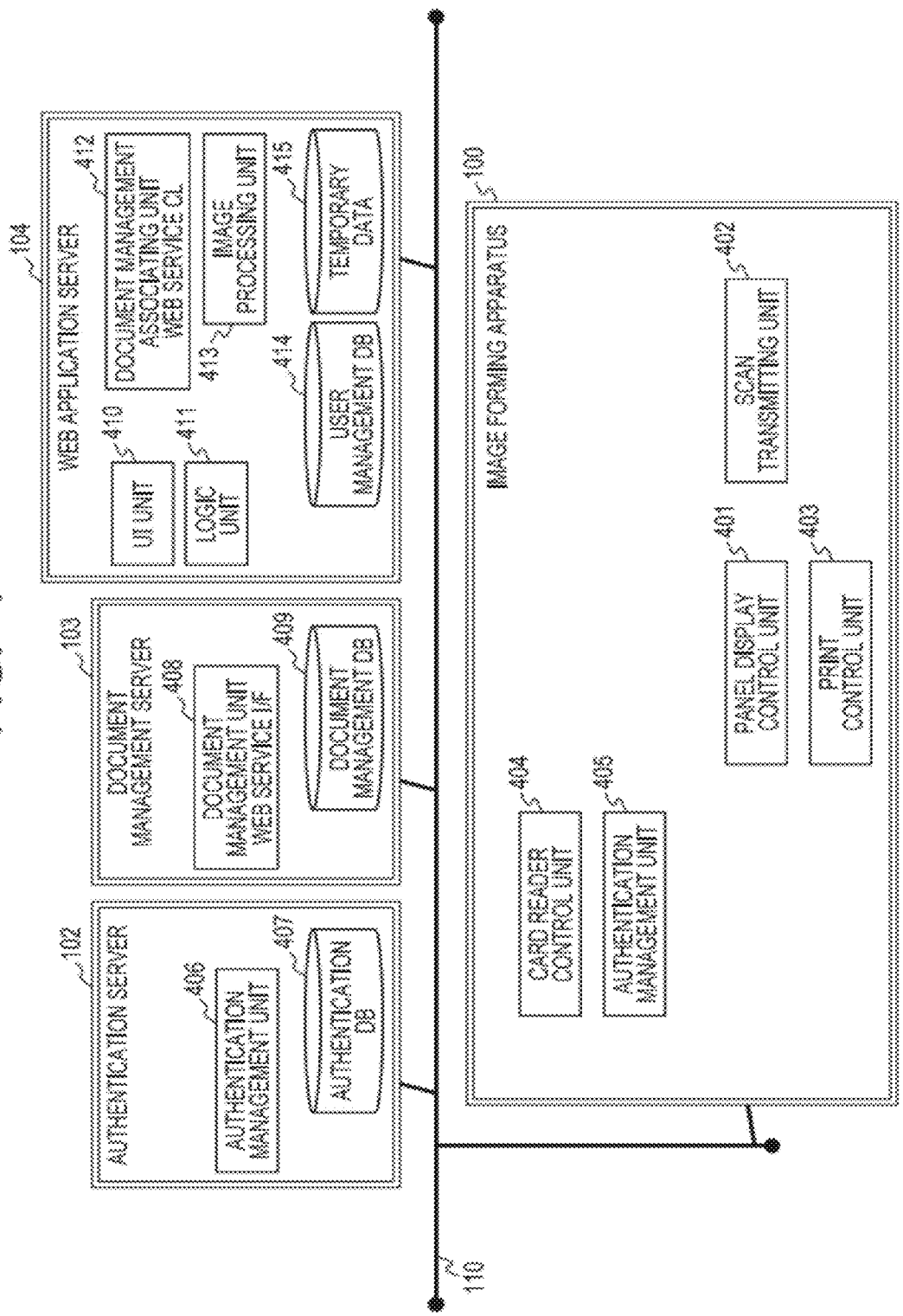
FIG. 4 is a fundamental function block diagram in the embodiment of the invention.

Subsequently, a software construction regarding each apparatus of the document management system of the invention will be described with reference to FIG. 4. FIG. 4 is a diagram schematically illustrating the software construction of each apparatus necessary in the document management system of the invention.

It is assumed that the image forming apparatus 100 has functions of a panel display control unit 401, a scan transmitting unit 402, a print control unit 403, a card reader control unit 404, and an authentication management unit 405.

It is assumed that the authentication server 102 has an authentication management unit 406 and a log-in authentication management database 407 to the image forming apparatus 100.

It is assumed that the document management server 103 has a document management unit 408 and a document management database 409.

The document management unit 408 functions as an interface of transmission and reception of document data from the Web application server 104. The document management database 409 stores and manages the document data which is uploaded by the user operation.

It is assumed that the Web application server 104 has a UI unit 410, a logic unit 411, a document management associating unit 412, an image processing unit 413, a user management database (DB) 414, and a temporary data storing unit 415.

The UI unit 410 functions mainly to display and control a UI for a Web Browser.

The logic unit 411 has a function such as a BUS represented by an Enterprise Service Bus of SOA. The logic unit 411 functions so as to process an instruction from the user which was received by the UI unit 410, request the image processing unit 413 to image-modify the scan data, request the document management associating unit 412 to store the document into the document management server 103, and control a data association with other systems and the like. The logic unit 411 also performs an output and input of data with internal data, and the like.

The document management associating unit 412 functions as an interface at the time when an instruction (check-in, check-out, etc.) to the document data received from the image forming apparatus 100 is sent to the document management unit 408 of the document management server 103. The image processing unit 413 functions to convert application data represented by "PDF" of Adobe Systems Inc. in U.S.A. or "Office" of Microsoft Corporation in U.S.A. and various kinds of image files into a unified image format in order to form a preview display screen prior to printing the document data which is transmitted from the document management server 103 or in order to form a preview display screen prior to storing the scan data from the image forming apparatus 100 into the document management server 103.

A data table, which will be described in FIG. 9 hereinafter, has been stored in the user management DB 414 and is data for associating the user ID authenticated in the image forming apparatus 100 with the user ID managed by the document management server. The temporary data storing unit 415 is an area for temporarily storing the data before printing obtained from the document management server 103 and temporarily storing the scan data from the image forming apparatus 100 before it is stored into the document management server 103. There is also a case where the temporary data storing unit 415 is used for reservation-printing of the data obtained from the document management server 103.

Figure 5:
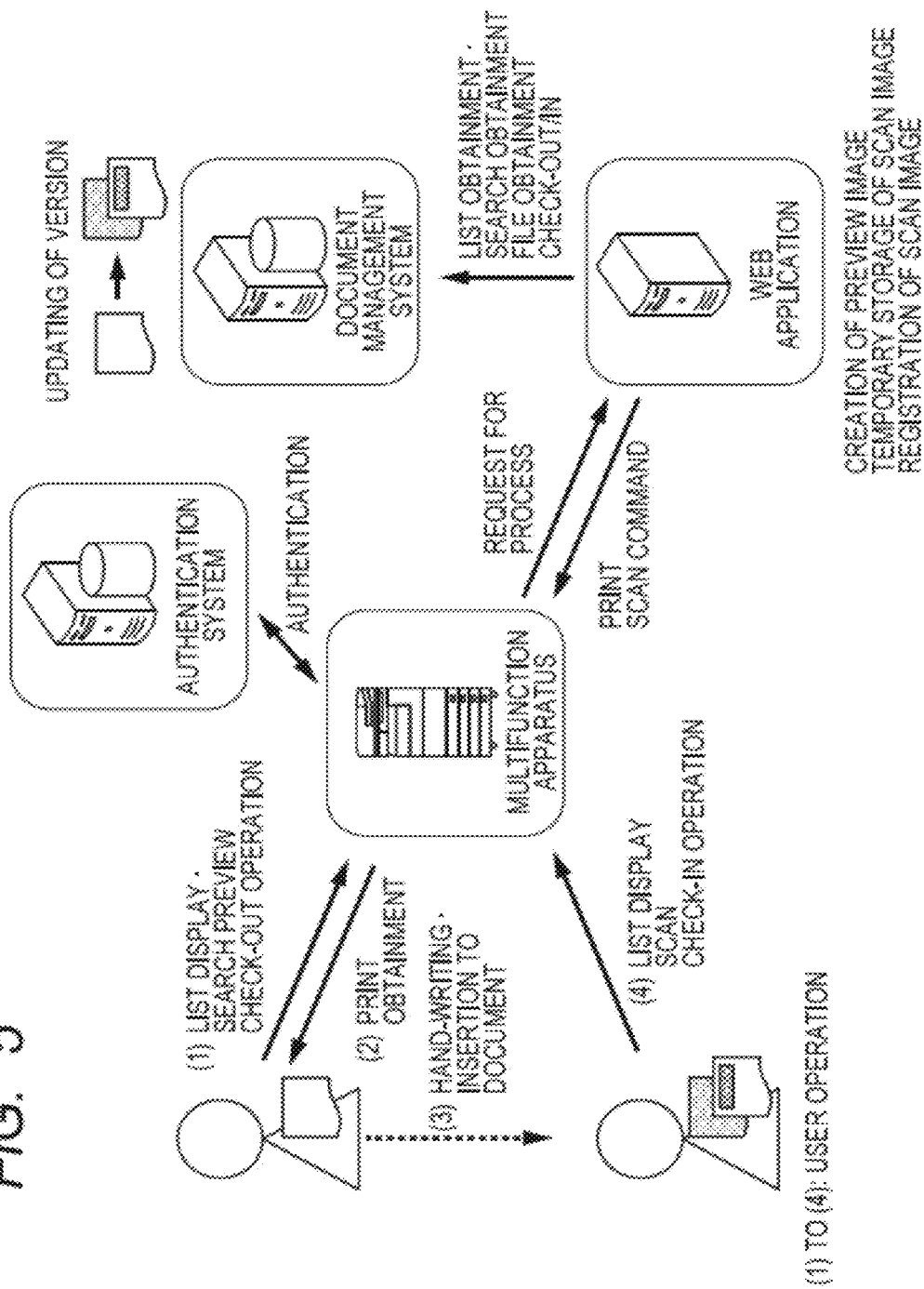
FIG. 5 is a schematic diagram of processes in the embodiment of the invention.

Subsequently, a flow of the data in the document management system of the invention will be schematically described with reference to FIG. 5.

First, the image forming apparatus 100 accepts a log-in of the user, accesses the authentication system (authentication server 102), and makes an authentication. When the log-in of the user to the system is authenticated, in order to obtain the document data which was uploaded by the user, an obtaining request of the document data is issued to the document management server 103 through the Web application server 104.

The document management server 103 searches for the document data stored in the apparatus by using a search word adapted to search for the document data requested from the user. When the search is finished, a list of search results is transmitted to the image forming apparatus 100. A check-out and an output of the document data whose selection of the user has been received are executed.

When a check-in of the document edited by the user is executed, an obtaining request of the document data is also similarly issued to the document management server 103 through the Web application server 104. The document data which is checked-in at this time is selected from a list of the obtained document data and a scan of the document is executed in the image forming apparatus 100. The scanned document data is stored into a same file path as that of predetermined document data in the document management server 103 through the Web application server and a version of the document data is updated. When the scanned document data is stored into the document management server 103, the document data which has been in the check-out state is checked-in and the edition lock is cancelled.

Subsequently, a series of processes until the check-out and check-in which are executed in the document management system of the invention will be described by flowcharts with reference to FIGS. 6 to 8. When describing by steps in each flowchart, a user interface which is displayed on the display of the image forming apparatus 100 in FIGS. 13 to 17 will be also properly described.

Figure 6:
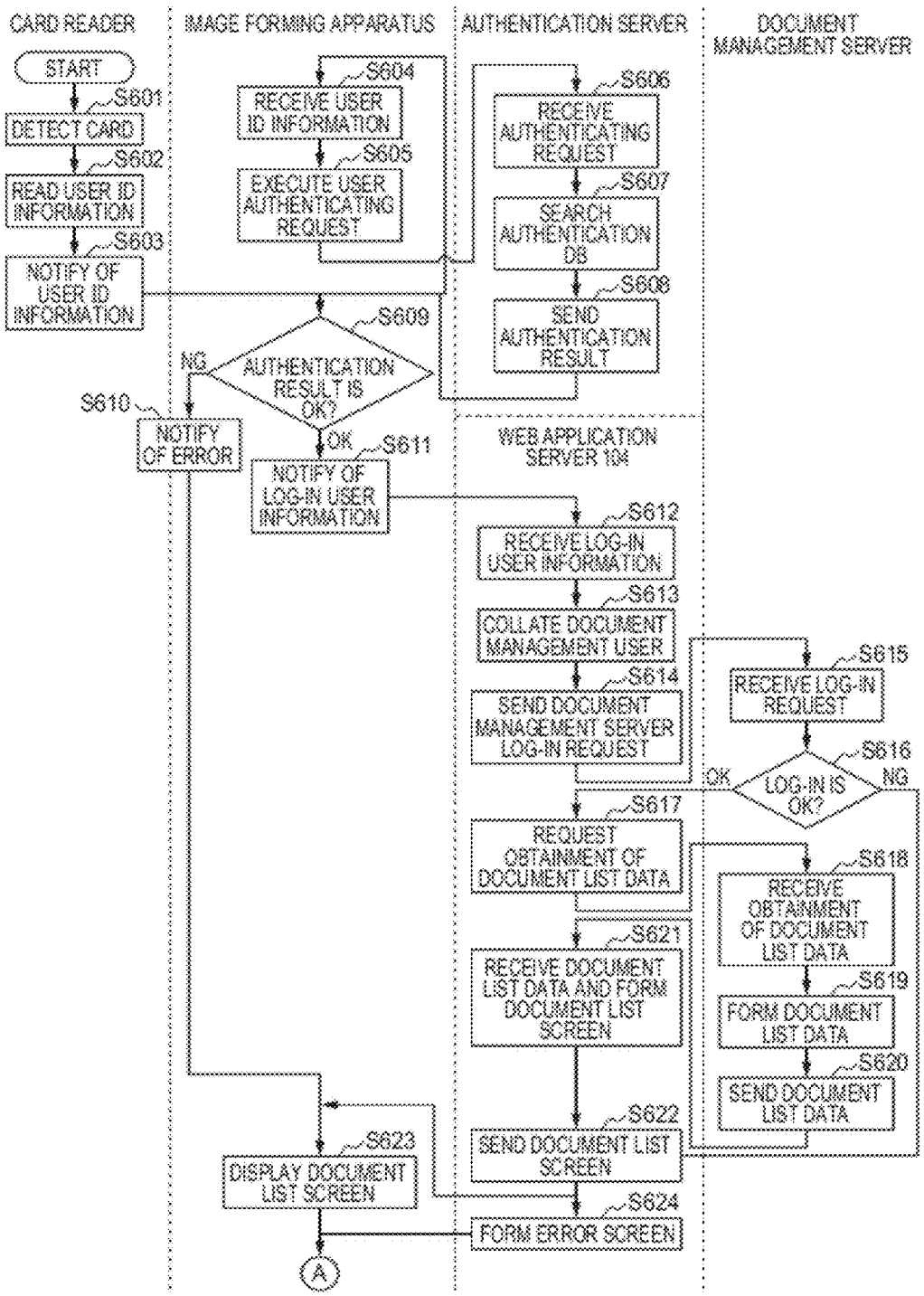
FIG. 6 is a diagram illustrating a processing flow in the embodiment of the invention.

FIG. 6 is a flowchart illustrating a series of processes in which the image forming apparatus 100 receives authentication information from the user and makes a log-in to the document management server 103.

First, in order to log-in to the image forming apparatus 100, the user puts a recording medium (IC card or the like; a storing format is not limited) in which user identification (ID) information has been stored onto a reading unit of the card reader 101 equipped for the image forming apparatus 100. When the card reader 101 detects the recording medium in step S601 in FIG. 6, in step S602, the user ID information recorded in the recording medium is read out by the card reader.

The information stored in the recording medium which the user possesses is as shown in a card storage information table 1210 in FIG. 12. In the description of the invention, a process for recording the user ID information into the recording medium is omitted. However, the formatted recording medium is disposed to a card writer, the operation of a controller (software keyboard, buttons, and the like displayed on the display) of the image forming apparatus 100 is received, a user ID 1211 is written, the user ID information and ID information (IC card ID 1202) of the recording medium are transmitted to the authentication server 102, and a user ID 1201 and the IC card ID 1202 are associated and stored in an authentication data table 1200. It is assumed that in the authentication data table 1200, an administrator flag 1203 can be set by a user maintenance (setting method is omitted here).

In step S603, the card reader 101 sends the read user ID information to the image forming apparatus 100. When the CPU 301 of the image forming apparatus 100 receives the user ID information from the card reader 101 in step S604, in step S605, in order to discriminate whether or not the log-in can be performed, the authentication management unit 405 of the image forming apparatus 100 transmits the user ID information received from the card reader in step S604 to the authentication server 102 and executes an authenticating request.

When the CPU 201 of the authentication server 102 receives the user ID information of the user who performs the log-in and the authenticating request of the user from the image forming apparatus 100 in step S606, in step S607, the CPU searches whether or not the received user ID information has been stored in the authentication data table 1200 in FIG. 12. In step S608, an authentication result is returned to the image forming apparatus 100.

If the authentication result received from the authentication server 102 is NG (that is, the user ID information which is not registered in the database) in step S609, the CPU 301 of the image forming apparatus 100 notifies the user of a log-in error in step S610, thereby allowing the user to finish the process. A notifying method of the error is not particularly limited. For example, a message to notify the user of the log-in error may be displayed on a display of the image forming apparatus 100. If the multifunction apparatus has a voice guiding function, an audio file for notifying the user of the low-in error among audio files which have previously been registered may be also reproduced.

If the authentication result in step S609 is OK (that is, the user ID information registered in the authentication data table 1200), the CPU 301 of the image forming apparatus 100 transmits the user ID information of the log-in permitted user to the Web application server 104.

When the CPU 201 of the Web application server 104 receives the user ID information of the log-in permitted user from the image forming apparatus 100 in step S612, in order to obtain a document management system ID associated with the user who logged-in, the user information of a document management system ID 903 associated with the user ID information of the log-in user is collated with a user management database 900 in FIG. 9.

FIG. 9 illustrates the user management database which has been stored in a storing unit of the Web application server 104 and which makes the user ID information (user ID 1201 in FIG. 12) of the user who can use the image forming apparatus 100 and the user ID information of the user who can access the document management server 103 correspond to each other.

It is desirable that the user management database 900 has items of a user ID 901, a device ID 902, the document management system ID 903, and a password 904 necessary when the user logs-in to the document management system.

The user ID 901 is a character string which is unconditionally allocated when the user of the document management system of the invention is stored into the user management database of FIG. 9.

The device ID 902 is user ID information to log-in to the image forming apparatus 100 and is the same character string as that of the user ID (1201 in FIG. 12) stored in the IC card.

The document management system ID 903 is ID information to log-in to the document management system which logs-in to the document management server 103, brows a document list on the display of the image forming apparatus 100, and is disclosed in the invention. The password 904 is a password which is necessary when the user logs-in to the document management server 103.

Although a setting registering method of the document management system ID 903 is not particularly decided in the flowcharts of the invention, it is a general method that an account for accessing the document management server 103 is formed through the Web Browser installed in the client PC 105 or the image forming apparatus 100.

Subsequently, a description will be made by returning to the flowchart of FIG. 6. When the user management database is called and the collation of the document management system ID 903 is completed in step S613, in step S614, the CPU 201 of the Web application server 104 transmits the document management system ID 903 and the password 904 for log-in to the document management server 103 in order to log-in to the document management server 103.

When the CPU 201 of the document management server 103 receives a log-in request in step S615, the CPU discriminates in step S616 whether or not the log-in to the document management server 103 can be performed. If the log-in can be performed as a result of the discrimination, the discrimination result is returned to the Web application server 104. In step S617, the CPU 201 of the Web application server 104 transmits an obtaining request of a document list of the user who is performing the log-in to the document management server 103 on the basis of the discrimination result about the log-in to the document management server. In the log-in discrimination, whether or not the relevant document management system ID 903 has been stored in the relevant database is confirmed by using a user database (not shown) stored in the document management server 103.

When the CPU 201 of the document management server 103 receives the obtaining request of the document list in step S618, the CPU forms document list data from the user ID of the user who is performing the log-in to the document management system in step S619 and transmits the document list data to the Web application server 104 in step S620. As for the document data written on the document list formed here, the document data in which an access right has been set for the user who is performing the log-in is obtained as a list.

As for the document list which is formed here, in the document data stored in the document management server 103, the document data in which the access right has been set for the user who is performing the log-in is obtained and formed. In order to form the document list, in a bibliography information data table 1100 of the document data stored in the document management server 103 in FIG. 11, a document ID 1101, a document name 1102, a check-out flag 1107, a file path 1112, a server name of the document management server 103 in which the document data has been stored, and real data of the document data are obtained, thereby forming the document list. The formed document list is temporarily stored in the Web application server 104 in a format of FIG. 10.

Although a method of setting the access right to the user is not particularly determined, for example, if the user name associated with the user ID is a creator or updater of the document data, it is determined that the access right has been set. If any item of a group to which the user belongs exists in the user database, in the case where the access authority of the document data has been set to the group, the document data can be also obtained as a document list.

When the Web application server 104 receives the document list data, a document list display screen to display the document list onto a display unit of the image forming apparatus 100 is formed in step S621. In step S622, the CPU 201 of the Web application server 104 transmits the document list display screen to the image forming apparatus 100. When the document list display screen is received, in step S623, the image forming apparatus 100 displays such a screen onto the display unit and receives a selection of a document which is checked-in and checked-out. The processing routine advances to step S706 in FIG. 7.

Figure 13:
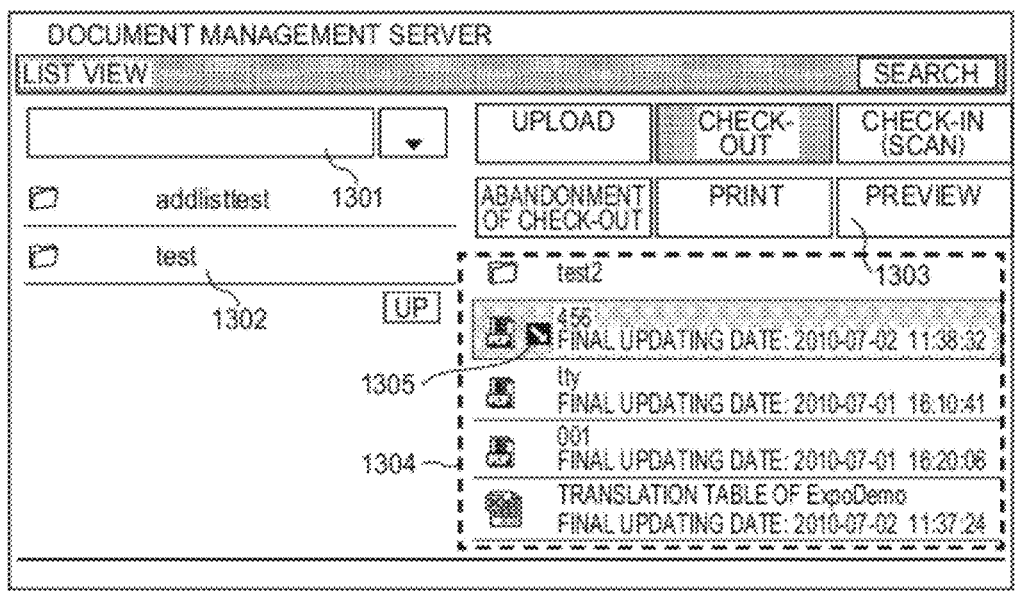
FIG. 13 is an example of a display screen illustrating a fundamental user interface in the embodiment of the invention.

FIG. 13 is a display screen diagram illustrating a display example of a document list view display screen which is displayed on a display of the image forming apparatus 100.

A path selecting unit 1301 of a document list display screen 1300 selects paths, in a pull-down format, in which the document data included in the document list obtained in step S618 from the document management server 103 has been stored. When the paths in which the document which the user wants to obtain has been stored are selected by the path selecting unit 1301, the selected paths are displayed onto a path display unit 1302. By receiving a selected one of the paths displayed on the path display unit 1302, folders and files subsequent to the selected path are displayed into a document data display area 1304.

An icon based on an extension of the file, a document name, a final updating date, and a check-out icon 1305 showing the check-out state are displayed in the document data display area 1304. Those information can be displayed because when the document management server 103 forms the document list in step S618, the information which is obtained from the bibliography information data table of the document data is temporarily stored in the format of FIG. 10.

The check-out icon 1305 shown in the column of the document name displayed in the document data display area 1304 indicates that the document data is in the check-out state at present. Such information can be displayed because the information of the check-out flag 1107 in the bibliography information data table 1100 in FIG. 11 is obtained.

When the document data in which the check-out icon 1305 has been displayed is selected, the check-out flag among instruction buttons 1303 is displayed in a gray-out or reversing state so that it cannot be selected.

In the document list display screen, the check-out icon 1305 is not always displayed only for the document data whose check-out has been executed by the user who logged-in to the image forming apparatus 100 and instructed the connection to the document management server 103. The document data whose check-out has been executed by an instruction of another user is also displayed in the document data display area 1304. Further, the check-out icon 1305 showing that the check-out has been executed can be displayed. The check-out icon 1305 which is added to the document data whose check-out has been executed by the instruction of another user can be displayed in such a format that it can be distinguished from the check-out icon 1305 of the document data whose check-out has been executed by the user who is performing the log-in. For example, such control that the color or shape of each icon is changed is made. Thus, the user can be enabled to recognize that the document data whose check-out has been executed was executed by the instruction of which user.

The buttons 1303 are pressed to instruct the printing/scan which is executed by the image forming apparatus 100 and the check-in and check-out to the document management server 103 for the document data selected in the document data display area 1304.

In the diagram, the document name displayed in the document data display area 1304 has been selected, a background of the selected portion in the document data display unit has been reversed, the check-out icon 1305 showing that the selected document is in the check-out state has been checked, a depression of each of instruction buttons of the check-out and check-in of the document, an abandonment of the check-out, printing, and a preview is received, and the instruction can be executed.

When the selection of the document data whose check-out has been executed by another user is received, the buttons of "check-out", "check-in (scan)", and "abandonment of check-out" among the buttons 1303 are set into a non-display state.

Figure 16:
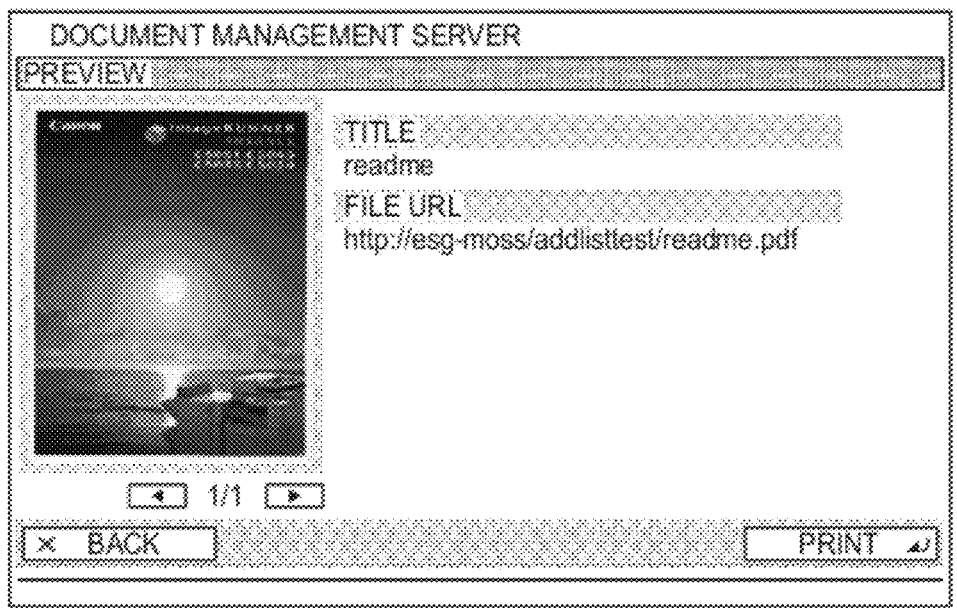
FIG. 16 is an example of a display screen illustrating a fundamental user interface in the embodiment of the invention.

When the selection of the document data whose check-out has been executed by another user is received and "preview" among the buttons 1303 is depressed, a warning showing "This document is a document which is being edited by another user." is displayed in a preview display screen of FIG. 16.

Figure 14:
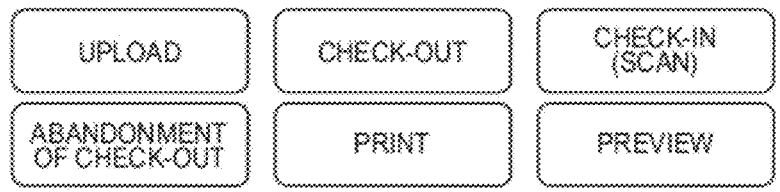
FIG. 14 is an example of a display screen illustrating a fundamental user interface in the embodiment of the invention.

As displayed in detail in FIG. 14, when an "upload" button is pressed, the scan is performed by the image forming apparatus 100 and the document data (PDF file) of the scanned document is registered into a selected folder or list. When a "check-out" button is pressed, a check-out instruction of the document selected in the document data display area 1304 is executed. When a "check-in (scan)" button is pressed, a check-in instruction of the selected document is executed.

When an "abandonment of check-out" button is pressed, an instruction of the abandonment of the check-out (that is, unlock) of the document selected in the document list selecting unit is executed. The "abandonment of check-out" button is displayed so that it can be depressed only when the document in the check-out state is selected from the document list. When other documents are selected, the "abandonment of check-out" button is displayed in a gray-out state or the like so that it cannot be depressed. When a "print" button is pressed, a print instruction of the document selected in the document list selecting unit is executed. When a "preview" button is pressed, a preview instruction of the document selected in the document list selecting unit is executed. When the preview instruction is made, the Web application server 104 obtains the document selected in the document list selecting unit from the document management server 103, requests the image processing unit 413 to form a preview image, and obtains and forms the preview image.

The authentication data table 1200 in FIG. 12 has been stored in the storing unit of the authentication server 102. It is desirable that the authentication data table 1200 has items of the user ID 1201, IC card ID 1202, and administrator flag 1203. The user ID 1201 is unconditional ID information which each user possesses.

According to the foregoing processes which are executed in the flowchart of FIG. 6, merely by performing the log-in to the image forming apparatus 100 without receiving the operation of the client PC by the user, the user collates the user ID for using the image forming apparatus 100 and the document management system ID associated therewith and accesses the document management server and can obtain the stored document list.

Subsequently, processes for searching for and outputting the document in order to perform the check-out after completion of the log-in to the document management server will be described with reference to FIG. 7.

First, in accordance with the user operation, the CPU 301 of the image forming apparatus 100 searches for the document to be checked-out from the document list of the user who is performing the log-in. A search display screen which is displayed onto the display of the image forming apparatus 100 is a search display screen 1500 of FIG. 15.

The search display screen 1500 has a text box 1501 for inputting a search word. For example, in FIG. 15, a keyword "read me" is input. When a search button 1502 is pressed, the documents stored in the document management server are displayed as a list by the keyword which was input to a list 1503 of search results.

In step S701, the CPU 301 of the image forming apparatus 100 receives the input of the search word in accordance with the user operation and transmits a search request for displaying the document list in the image forming apparatus 100 to the Web application server 104. When the search word is received, the CPU 201 of the Web application server 104 executes a search instruction using the search word to the document management server 103 in step S702.

When the search word is received, in step S703, the document management server 103 searches for the stored document from the storing unit of the server on the basis of the search word, and when the search is finished, the list of the search results is returned to the Web application server 104.

Figure 15:
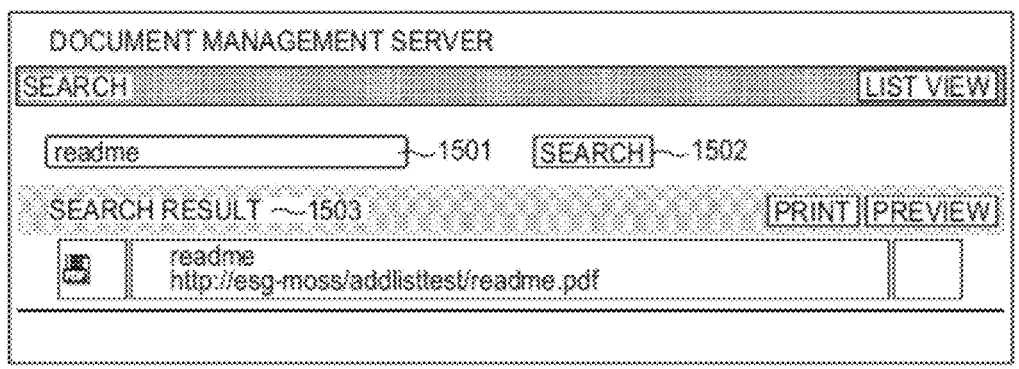
FIG. 15 is an example of a display screen illustrating a fundamental user interface in the embodiment of the invention.

In step S704, the CPU 201 of the Web application server 104 receives the data of the search result list, forms a document list display screen, and transmits the document list display screen to the image forming apparatus 100 (FIG. 15).

In step S705, the document list display screen as a result of the search is displayed onto the display of the image forming apparatus 100. The apparatus enters a standby mode and the CPU 301 of the image forming apparatus 100 receives the selection of the document from the document list display screen in accordance with the user operation. In step S706, the CPU 301 receives the depression of the preview button in FIG. 14. When the selection is received, in order to obtain a preview display screen of the selected document, the CPU 301 transmits an obtaining request of the preview display screen to the Web application server 104.

When the obtaining request of the preview display screen is received, in order to return the display screen to the image forming apparatus 100, in step S707, the CPU 201 of the Web application server 104 issues a document data obtaining request of the selected document to the document management server 103 so as to execute the obtainment of the selected document data. At this time, information (for example, document ID and the like; the information is not limited) of the document data which has been selected on the document list display screen and in which the preview instruction has been received is transmitted to the document management server 103.

When the document data obtaining instruction from the Web application server 104 is received, in step S708, the CPU 201 of the document management server 103 obtains the document data from the storing unit by using, for example, the document ID of the document data in which the obtaining instruction has been received as a key and returns the document data to the Web application server 104.

When the document data sent from the document management server 103 is obtained, in step S709, the CPU 201 of the Web application server 104 stores the document data into a temporary storing unit (cache memory or the like) of the Web application server 104. In step S710, preview display screen information of the document data is formed and transmitted to the image forming apparatus 100.

When the preview display screen information is received from the Web application server 104, in step S711, the image forming apparatus 100 displays the preview display screen onto the display (FIG. 16).

In step S712, the CPU 301 of the image forming apparatus 100 receives the depression of the "check-out" button in FIG. 14 so as to perform an edition and proofreading. When the depression of the "check-out" button is received, the image forming apparatus 100 transmits information (document name, document ID, file path of the document data, etc.) for specifying the document data selected by the user and the check-out instruction to the document data to the Web application server 104.

When the CPU 201 of the Web application server 104 receives the information (document name, document ID, file path of the document data, etc.) for specifying the selected document data and the check-out instruction to the document data from the image forming apparatus 100 in step S713, in order to confirm whether or not the check-out can be performed to the document data, whether or not a status of the document data is the check-out state is confirmed in step S714-1. As a confirming method, it is confirmed that a value of a check-out flag 1009 in the data table of FIG. 10 stored in the Web application server 104 is equal to "0" (check-in state).

If the document data in which the check-out instruction has been received is not in the check-out state (YES in S714-1), the CPU 201 of the Web application server 104 transmits a check-out request of the document data in which the check-out instruction has been received to the document management server 103 in step S714-2.

On the other hand, if the document data in which the check-out instruction has been received is in the check-out state (NO in S714-1), the check-out cannot be executed at this timing. Therefore, a display screen of a check-out error is formed. In step S714-3, a message showing that the check-out of the document data displayed on the preview display screen cannot be performed is displayed and the processing routine is returned to step S712.

When the check-out instruction of the selected document data is received from the Web application server 104, in step S715, the CPU 201 of the document management server 103 executes the check-out of the document data serving as an instruction target. Specifically speaking, the check-out of the document data is executed by rewriting a value of the check-out flag 1107 in the bibliography information data table 1100 from "0" to "1". Further, the document data is locked so that another user cannot edit the document data in the check-out state. After completion of the rewriting of the check-out flag 1107, the CPU 201 of the document management server 103 transmits the information of the updated check-out flag 1107 to the Web application server 104, rewrites a value of the check-out flag 1009 in FIG. 10 to "1" and notifies the Web application server 104 of the execution of the check-out.

In step S716, the CPU 201 of the document management server 103 transmits the selected document data to the Web application server 104. In step S717, the CPU 201 of the Web application server 104 receives the document data as a target of the check-out.

In step S718, the CPU 201 of the Web application server 104 develops the document data received by an OCR reading unit and analyzes character data in the document data by an OCR process. When the check-in of the document data is executed later, such a process is executed to discriminate whether or not the document data to be checked-in is the document data obtained by editing the document data at the time of check-out by discriminating a degree of coincidence of the contents by collating the scan data which is obtained by scanning at the time of check-in and the document data before the check-out. The character data which is obtained by the OCR process in step S718 is called "analysis data" in the embodiments of the invention.

In step S719, the CPU 201 of the Web application server 104 stores the analysis data obtained in the previous step into the storing unit of the Web application server 104.

Figure 18:
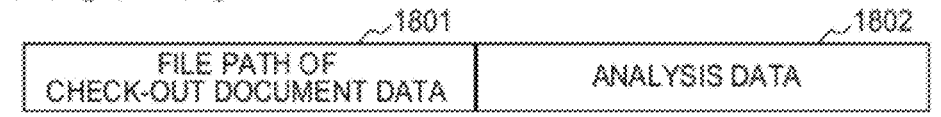
FIG. 18 is a diagram illustrating a table layout of a fundamental database in the embodiment of the invention.

FIG. 18 is a table of the analysis data which is stored in the storing unit of the Web application server 104.

A file path (storage destination) 1801 in the document management server 103 in which the document data serving as a check-out target which is transmitted from the document management server 103 in step S716 has been stored is illustrated. For example, in order to show an address of the server, an accessing destination on the Internet is written as follows.

http://documentfilingmanagementsystem.com/fukuda/patent/application/ . . . .

Analysis data 1802 obtained by the OCR process of the Web application server 104 in step S718 is illustrated.

The CPU 201 of the Web application server 104 rewrites the check-out flag 1009 in FIG. 10 mentioned above. After completion of the storage of the analysis data, in step S720, in order to allow the user to recognize the document data which was checked-out, the CPU 201 updates the document list display screen in order to display the check-out icon 1305 showing the check-out state to the position of the document data on the document list display screen 1300.

In step S721, when the document list display screen which was formed in step S715 and whose check-out state has been updated is received from the Web application server 104, the CPU 301 of the image forming apparatus 100 displays the document list display screen onto the display unit. Subsequently, in step S722, the CPU 301 of the image forming apparatus 100 receives a print instruction of the document data which was set into the check-out state in the previous step S720 and transmits it to the Web application server 104 in accordance with the user operation.

In step S723, when the print instruction of the document data in which the check-out has been executed is transmitted to the Web application server 104, the document data which was temporarily stored in the previous step S709 is called from the temporary storing unit (cache memory or the like) and the print data is formed (step S724).

In step S725, the CPU 201 of the Web application server 104 transmits the print data formed in step S724 to the image forming apparatus 100. The image forming apparatus 100 executes the printing in step S726.

Figure 7:
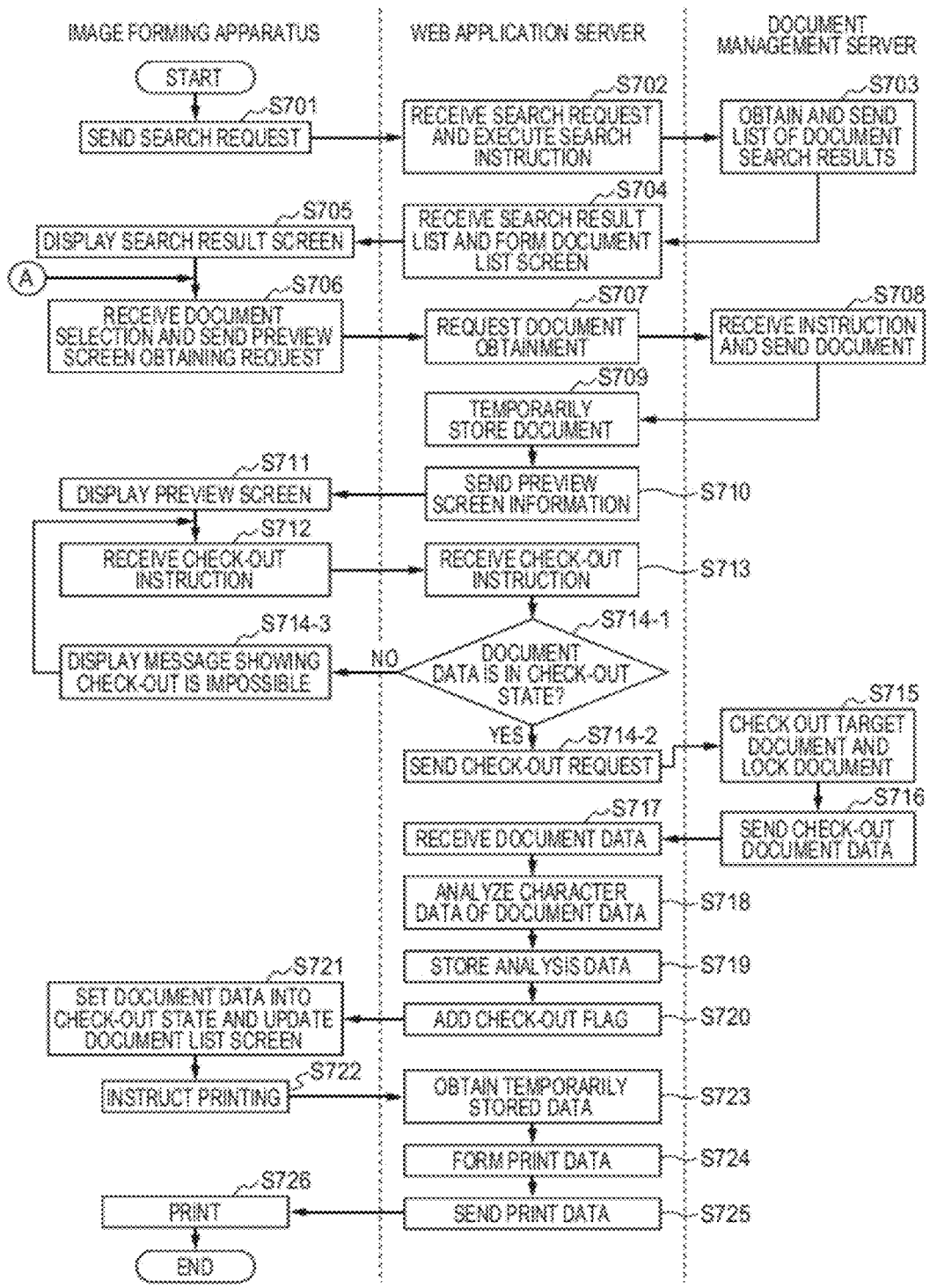
FIG. 7 is a diagram illustrating a processing flow in the embodiment of the invention.

According to the foregoing processes which are executed in the flowchart of FIG. 7, by receiving the operation of the image forming apparatus 100 by the user, the document list is obtained from the document management server 103, the document data which the user wants to check out is selected, and the document can be output simultaneously with the check-out.

In the sequence chart, the processes have been described along the flow in which after the displaying request of the preview display screen was received from the image forming apparatus 100 in step S706, the preview of the document is confirmed and the check-out is instructed. However, for example, the processes can be also executed by the following procedure. That is, after the document list display screen was displayed in step S705, the selection of the document data which the user wants to check out is received. The Web application server 104 transmits the check-out instruction to the document management server 103, obtains predetermined document data from the document management server 103, thereafter, stores the document data into a predetermined temporary storing area, and forms the preview image of the document data.

Subsequently, a process for scanning the document data and checking-in the document which has been in the check-out state will be described with reference to FIG. 8.

First, the user logs-in to the image forming apparatus 100 and obtains the document list display screen of the document data which has been stored and managed in the document management server 103 in accordance with the processing flow of FIG. 6. Subsequently, in order to newly check-in the document data in the check-out state in which the check box of the check-out icon 1305 has been displayed among the document data displayed in the document data display area 1304 in the document list display screen 1300, the CPU 301 of the image forming apparatus 100 receives a designation of the document data in the check-out state in step S801.

In step S802, in a state where the document data in the check-out state has been selected in the previous step S801, the CPU 301 of the image forming apparatus 100 receives the depression of the "check-in (scan)" button and transmits a scanning instruction to check-in to the designated document data in the check-out state to the Web application server 104. At this time, a selection of a file format (selection of an extension) of the document data to be scanned is received.

When the scanning instruction is received from the image forming apparatus 100 in step S803, the CPU 201 of the Web application server 104 discriminates in step S803-2 whether or not the file format (extension) of the document data of the document which is scanned and in which the selection has been received in the previous step S802 is the same as the extension of the document data in the check-out state which has been selected in step S801 in order to check-in. For example, if a TIFF format has been designated as a format of the scan data in step S802, it is also necessary that the file format of the document data in the check-out state is the TIFF format (extension is tif, tiff).

If it is determined that the file format is identical, an instructing display screen to execute the scan with respect to the instructed document data is formed and returned to the image forming apparatus 100. If the file format differs (for example, although the file format of the document data in the check-out state is the TIFF format, the PDF has been selected in the file format of the scan data), it is regarded that the document data is not the document data which can be checked-in to the different document data in the check-out state, and a warning is generated (for example, there is a warning by a voice or a warning which is displayed on the display screen), or an error showing that the check-in cannot be performed may be notified.

In step S804, the image forming apparatus 100 receives a display screen for executing the scan from the Web application server 104 and displays it. The display screen which is displayed at this time is illustrated in FIG. 17.

Figure 17:
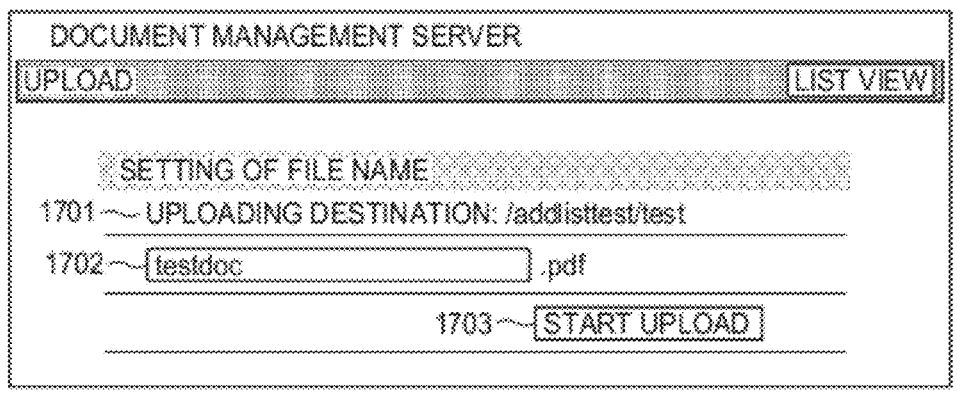
FIG. 17 is an example of a display screen illustrating a fundamental user interface in the embodiment of the invention.

An upload (scan) instructing display screen of FIG. 17 displays a storage destination 1701 (full file path) of the document data in the check-out state designated in step S801 mentioned above. A text box 1702 to set a file name of the document data to be uploaded is displayed and a document name can be registered. When the document name is input and a depression of a button 1703 to start the uploading is received, the scan is started. The document scanning is executed by receiving an operating instruction of the user. In step S805, the document data is transmitted to the Web application server 104.

When the document data scanned by the image forming apparatus 100 is received in step S806, in step S807, the CPU 201 of the Web application server 104 executes a search for the analysis data of the document data in the check-out state stored in the storing unit of the Web application server 104 by using the full file path (storage destination) of the selected document data in the check-out state as a key. It is the analysis data stored in step S719 mentioned above. If the analysis data cannot be obtained as a result of the search, an error notification is transmitted to the image forming apparatus 100, thereby notifying the user that the analysis data cannot be obtained.

In step S808, the CPU 201 of the Web application server 104 compares the contents of the obtained analysis data and the scan data of the document scanned in step S804, thereby discriminating a degree of coincidence between them. The OCR process is executed to the scan data of the document scanned in step S804 and analysis data of the scan data is also obtained. By comparing the contents of the analysis data of the scan data and the analysis data of the document data in the check-out state, whether or not the document data to be checked-in is the document obtained by editing the document data in the check-out state is discriminated.

At this time, in the discrimination about the degree of coincidence at the time of check-in which is performed in the Web application server 104, it is assumed that a threshold value of the coincidence degree has been preset in the Web application server 104. For example, it is assumed that if the coincidence degree between the analysis data obtained as a result of the analysis of the scan data and the analysis data of the document data in the check-out state is equal to or less than 30%, it is determined that the document data is not the data obtained by editing the same document, and the image forming apparatus 100 is notified of a check-in discrimination error in step S809. Naturally, it is assumed that the threshold value of the coincidence degree is freely set by the administrator.

As a result of the comparison in step S808, if it is decided that the document data which was scanned so as to be checked-in is the document data obtained by editing the document data in the check-out state, in step S810, the document data of the document scanned in step S804 is stored into the temporary storing unit of the Web application server 104 and in order to display the document data onto the display of the image forming apparatus 100, a preview image of the document data and a preview display screen for displaying the preview image are formed and display screen information is transmitted to the image forming apparatus 100 (step S811).

When the preview display screen information transmitted from the Web application server 104 is received, in step S812, the CPU 301 of the image forming apparatus 100 displays the preview display screen onto the display. When the preview display screen of the document data is displayed in the image forming apparatus 100, the apparatus enters a standby state where the check-in instruction from the user is received. At this time, the preview display screen of FIG. 16 is displayed.

In step S813, the CPU 301 of the image forming apparatus 100 receives the document check-in instruction from the user and transmits the instruction to the Web application server 104. The check-in instruction is executed by receiving the depression of the "check-in" button in FIG. 14.

In step S814, the CPU 201 of the Web application server 104 calls again the document data stored in the temporary storing unit in step S806 mentioned above. The CPU 201 uploads the document data into the document management server 103 (step S815). An uploading destination is a path in which the document data in the check-out state in which the designation has been received by the user operation in step S801 mentioned above was stored and has information at 1008 in FIG. 10.

In step S816, the CPU 201 of the document management server 103 stores the received document data into the temporary storing unit and transmits a notification showing completion of the uploading to the Web application server 104.

When the uploading completion notification is received from the document management server 103, in step S817, the CPU 201 of the Web application server 104 sends the check-in instruction to the document data in which the check-in instruction has been received in step S810 to the document management server 103. When the check-in instruction is received, the CPU 201 of the document management server 103 rewrites the value of the check-out flag 1107 in the bibliography information data table of the document data to "0", changes the status from the check-out state to the check-in state (unlocking), and transmits the information in which the check-out flag 1107 has been updated to the Web application server 104 (step S818).

At this time, the document data stored until it is updated is stored as document data of the version before the updating. The document data of Last2 Version and the document data of Last1 Version in the bibliography information data table of FIG. 11 are rewritten, respectively.

In step S819, the CPU 201 of the Web application server 104 updates the check-out flag 1107 in the temporary storage data table (FIG. 11) of the document data in which the check-in instruction has been made in step S817 from the check-out state of "1" to the check-in state of "0", forms a new document list display screen, and transmits to the image forming apparatus 100. The Web application server 104 deletes the analysis data of the document data in the check-out state stored in an analysis data table of FIG. 18.

The image forming apparatus 100 changes the document list display screen 1300 of FIG. 13 which was transmitted from the Web application server 104 and in which the status of the document list has been updated and displays the changed screen.

FIG. 10 illustrates the temporary document data stored in the Web application server 104. A document ID 1001 is a number (character string) which is allocated when the document data is uploaded into the Web application server 104 and which can be unconditionally identified. A document server name 1002 indicates a name of the document management server 103 in which the document data has been stored and managed. In the case of the check-out state, the document which was downloaded from the document management server 103 corresponds to document data 1003. In the case of the check-in state, the document scanned from the image forming apparatus 100 corresponds to document data 1003. A document name 1004 is similar to the document name allocated to the document data which is uploaded into the document management server 103. It is also possible to construct in such a manner that when the document is uploaded, the document name can be registered.

A handle user ID 1005 indicates an ID of the user who has been operating the document management system of the invention when the document data is temporarily stored into the Web application server 104. When the document data is in the check-out state, as for a value of the ID, a parameter of the user ID of the user who instructed the check-out is input from the image forming apparatus 100. When the document data is in the check-in state, a parameter of the user ID of the user who uploaded the document of the latest version is input from the image forming apparatus 100.

A date of creation 1006 indicates a date when the document data has temporarily been stored in the Web application server 104. A time of creation 1007 indicates a time when the document data has similarly temporarily been stored in the Web application server 104.

FIG. 11 is a data table illustrating bibliography information of the document data stored in the document management server 103. It is desirable that the bibliography information data table 1100 has information of the document ID 1101, the document name 1102, document data 1103, a creator ID 1104, a date of creation 1105, a date of updating 1106, the check-out flag 1107, and version information 1108.

The document ID 1101 is the number (character string) which is allocated when the document data is uploaded into the document management server 103 and which can be unconditionally identified.

The document name 1102 is similar to the document name allocated to the document data which is uploaded into the document management server 103. It is also possible to construct in such a manner that when the document is uploaded, the document name can be registered.

As for the creator ID 1104, a value of the user name registered in word processor software for creating the document data or a value of the user name of the client terminal is succeeded as it is. The creation date 1105 indicates time and date when the first version has been uploaded into the document management server 103. The updating date 1106 indicates time and date when the latest version has been uploaded into the document management server 103.

The check-out flag 1107 is a flag showing that the document data is in the check-out state. When the flag 1107 is equal to "0", it denotes that the document data is not checked-out. When it is equal to "1", it denotes that the document data is in the check-out state. The version information 1108 is updated each time the document data is checked-in, so that the latest value is shown. The updating of a version numerical value is executed by a user input, an automatic incrementation, or the like when the document data is scanned and checked-in or the like. Data of the first version has been stored in an area 1109. Data of the version of two generations before has been stored in an area 1110. Data of the version of one generation before has been stored in an area 1111.

Figure 8:
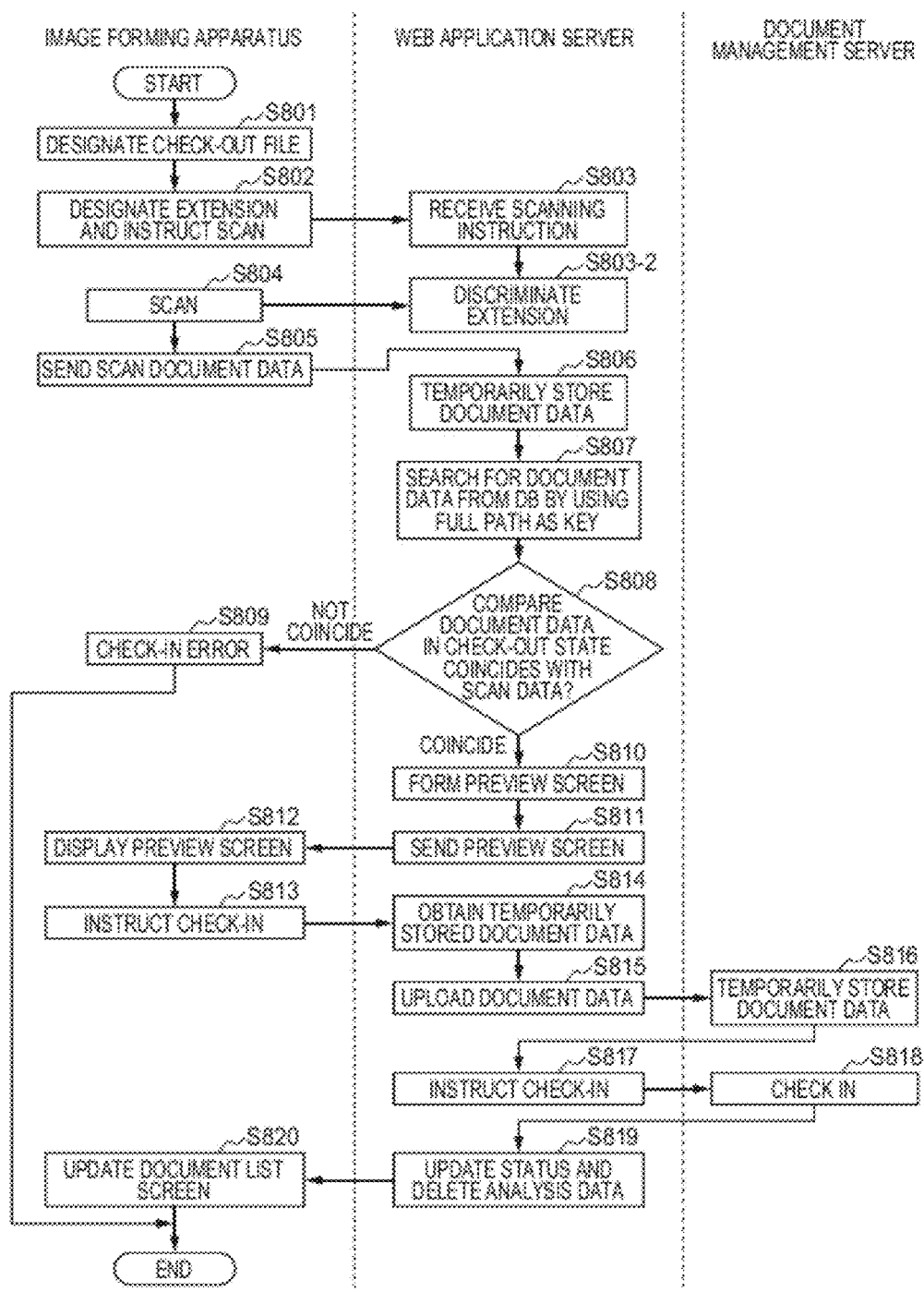
FIG. 8 is a diagram illustrating a processing flow in the embodiment of the invention.

According to the processes which are executed in the flowchart of FIG. 8 mentioned above, by receiving the user operation by the image forming apparatus 100, the document which was scanned in order to upload into the document management server 103 is not temporarily sent to the client PC but can be transmitted to the uploading destination (storage destination of the document of the old version in the document management server 103) after the scanning. The check-out and check-in of the document are performed from the log-in to the document management system and the version can be updated through the processes of FIGS. 6 to 8 without receiving the PC operation of the user.

As mentioned above, according to the invention, "improvement of working efficiency" in which the access to the document management system is realized and the editing operation of the document is completed without using the PC can be realized by using the document management system of the invention.

As mentioned above, the program in the invention is a program which can be executed by the computer serving as the image forming apparatus 100, authentication server 102, document management server 103, and Web application server 104 in accordance with the processes of the flowcharts illustrated in FIGS. 6 to 8. The program for enabling the image forming apparatus 100, authentication server 102, document management server 103, and Web application server 104 to execute the processing method of FIGS. 6 to 8 has been stored in the recording medium of the invention. The program in the invention may be an independent program for every processing method of each apparatus in FIGS. 6 to 8.

That is, according to the invention, there is provided a document management system including an information processing apparatus which can communicate with a document management apparatus in which document data has been stored and an image processing apparatus having a print unit for printing the document data and a display unit, wherein the image processing apparatus comprises: a document list display unit configured to display a list of the document data stored in the document management apparatus onto the display unit; a check-out document selection receiving unit configured to receive, through the display unit, a selection of the document data to be checked-out from the document data displayed by the document list display unit; a print executing unit configured to receive the document data received by the check-out document selection receiving unit from the information processing apparatus and print a document through the print unit; a check-in instruction receiving unit configured to receive, through the display unit, a check-in instruction for updating the checked-out document data; a scan executing unit configured to execute a scan of the document printed by the print executing unit so as to update the document data in which the check-in instruction has been received by the check-in instruction receiving unit; and a scan data transmitting unit configured to transmit information for specifying the document data in which the check-in has been instructed by the check-in instruction receiving unit and scan data obtained by executing the scan by the scan executing unit to the information processing apparatus, and the information processing apparatus comprises: a check-out discriminating unit configured to discriminate whether or not the document data received by the check-out document selection receiving unit of the image processing apparatus is in a check-out state; a check-out unit configured to check-out the document data when it is determined by the check-out discriminating unit that the document data is not in the check-out state; an output instructing unit configured to issue an output instruction to the image processing apparatus so as to print the document data which was checked-out by the check-out unit; an uploading unit configured to transmit the scan data which was transmitted by the scan data transmitting unit of the image processing apparatus to the document management apparatus together with the information for specifying the document data to be checked-in; and a check-in unit configured to check-in the document data which has completely been uploaded into the document management apparatus by the uploading unit.

According to the invention, there is provided an image processing apparatus which can be connected to an information processing apparatus that can communicate with a document management apparatus in that document data has been stored and which has a print unit for printing the document data and a display unit, comprising: a document list display unit configured to display a list of the document data stored in the document management apparatus onto the display unit; a check-out document selection receiving unit configured to receive, through the display unit, a selection of the document data to be checked-out from the document data displayed by the document list display unit; a print executing unit configured to receive the document data received by the check-out document selection receiving unit from the information processing apparatus and print a document through the print unit; a check-in instruction receiving unit configured to receive, through the display unit, a check-in instruction for updating the checked-out document data; a scan executing unit configured to execute a scan of the document printed by the print executing unit so as to update the document data in which the check-in instruction has been received by the check-in instruction receiving unit; and a scan data transmitting unit configured to transmit information for specifying the document data in which the check-in has been instructed by the check-in instruction receiving unit and scan data obtained by executing the scan by the scan executing unit to the information processing apparatus.

According to the invention, there is provided an information processing apparatus which can be connected to an image processing apparatus having a print unit for printing document data and a display unit and which can communicate with a document management apparatus in that the document data has been stored, comprising: a check-out discriminating unit configured to discriminate whether or not the document data in which a selection of a check-out has been received from a document list displayed on the display unit of the image processing apparatus is in a check-out state; a check-out unit configured to check-out the document data when it is determined by the check-out discriminating unit that the document data is not in the check-out state; an output instructing unit configured to issue an output instruction to the image processing apparatus so as to print the document data which was checked-out by the check-out unit; an uploading unit configured to transmit scan data obtained by executing a scan by the image processing apparatus and information for specifying the document data in which a check-in instruction has been received by the image processing apparatus to the document management apparatus; and a check-in unit configured to check-in the document data which has completely been uploaded into the document management apparatus by the uploading unit.

As mentioned above, naturally, the object of the invention is also accomplished by a method whereby a recording medium in which a program for realizing the functions of the embodiments mentioned above is supplied to a system or an apparatus, and a computer (or a CPU or MPU) of the system or apparatus reads out the program stored in the recording medium and executes processes based on the read-out program.

In this case, the program itself read out of the recording medium realizes the novel functions of the invention and the recording medium in which the program has been stored constructs the invention.

As a recording medium for supplying the program, for example, a flexible disk, a hard disk, an optical disk, a magnetooptic disk, a CD-ROM, CD-R, DVD-ROM, a magnetic tape, a non-volatile memory card, an ROM, an EEPROM, a silicon disk, or the like can be used.

Naturally, the invention incorporates not only a case where the image forming apparatus 100, authentication server 102, document management server 103, and Web application server 104 execute the read-out program, so that the functions of the embodiments mentioned above are realized but also a case where an OS (Operating System) or the like which is operating in a computer executes a part of or all of actual processes on the basis of instructions of the program, and the functions of the embodiments mentioned above are realized by those processes.

Other Embodiments

Aspects of the present invention can also be realized by a computer or a system or apparatus (or devices such as a CPU or MPU) that reads out and executes a program recorded on a memory device to perform the functions of the above-described embodiments, and by a method, the steps of which are performed by a computer or a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-196006, filed Sep. 1, 2010, and No. 2011-121617, filed May 31, 2011 which are hereby incorporated by reference herein in their entirety.

What is claimed is:

1. A document management system including an information processing apparatus for communication with a document management apparatus which stores document data, and further including an image processing apparatus having a print unit for printing the document data and a display unit, wherein the image processing apparatus comprises:

a document list display unit configured to display a list of the document data stored in the document management apparatus onto the display unit;

a check-out document selection accepting unit configured to accept, through the display unit, a selection of the document data to be checked-out from the document data displayed by the document list display unit;

a print executing unit configured to receive the document data accepted by the check-out document selection accepting unit from the information processing apparatus and print a document through the print unit;

a check-in instruction accepting unit configured to accept, through the display unit, a check-in instruction for updating the checked-out document data;

a scan executing unit configured to execute a scan of the document printed by the print executing unit so as to update the document data in which the check-in instruction has been accepted by the check-in instruction accepting unit; and a scan data transmitting unit configured to transmit information for specifying the document data in which the check-in has been instructed by the check-in instruction accepting unit and scan data obtained by executing the scan by the scan executing unit to the information processing apparatus, and wherein the information processing apparatus comprises:

a check-out discriminating unit configured to discriminate whether or not the document data accepted by the check-out document selection accepting unit of the image processing apparatus is in a check-out state;

a check-out unit configured to check-out the document data when it is determined by the check-out discriminating unit that the document data is not in the check-out state;

a data analyzing unit configured to analyze the data so as to obtain contents of the document data checked-out by the check-out unit;

an analysis data storing unit configured to store analysis data obtained as a result of the analysis of the data analyzing unit;

an output instructing unit configured to issue an output instruction to the image processing apparatus so as to print the document data which was checked-out by the check-out unit;

a comparing unit configured to use the scan data obtained by executing the scan by the image processing apparatus and the analysis data stored in the analysis data storing unit, thereby comparing a degree of coincidence between the scan data and the analysis data in order to check-in the checked-out document data;

a check-in error notifying unit configured to notify the image processing apparatus of an error of the check-in without uploading the scan data to the document management apparatus by the uploading unit as document data to be checked-in when it is discriminated by the comparing unit that the degree of coincidence between the scan data and the analysis data is smaller than a preset threshold value;

an uploading unit configured to transmit the scan data transmitted by the scan data transmitting unit of the image processing apparatus to the document management apparatus together with the information for specifying the document data to be checked-in when it is discriminated by the comparing unit that the degree of coincidence between the scan data and the analysis data is larger than the preset threshold; and a check-in unit configured to check-in the document data which has completely been uploaded into the document management apparatus by the uploading unit.

2. An image processing apparatus connectable to an information processing apparatus for communication with a document management apparatus which stores document data, the image processing apparatus comprising:
- a print unit configured to print document data;
- a display unit configured to display data;
- a document list display unit configured to display a list of the document data stored in the document management apparatus onto the display unit;
- a check-out document selection accepting unit configured to accept, through the display unit, a selection of the document data to be checked-out from the document data displayed by the document list display unit;
- a print executing unit configured to receive the document data accepted by the check-out document selection accepting unit from the information processing apparatus and print a document through the print unit;
- a check-in instruction accepting unit configured to accept, through the display unit, a check-in instruction for updating the checked-out document data;
- a scan executing unit configured to execute a scan of the document printed by the print executing unit so as to update the document data in which the check-in instruction has been accepted by the check-in instruction accepting unit; and
- a scan data transmitting unit configured to transmit information for specifying the document data in which the check-in has been instructed by the check-in instruction accepting unit and scan data obtained by executing the scan by the scan executing unit to the information processing apparatus, wherein the information processing apparatus comprises:
- a check-out discriminating unit configured to discriminate whether or not the document data accepted by the check-out document selection accepting unit of the image processing apparatus is in a check-out state;
- a check-out unit configured to check-out the document data when it is determined by the check-out discriminating unit that the document data is not in the check-out state;
- a data analyzing unit configured to analyze the data so as to obtain contents of the document data checked-out by the check-out unit;
- an analysis data storing unit configured to store analysis data obtained as a result of the analysis of the data analyzing unit;
- an output instructing unit configured to issue an output instruction to the image processing apparatus so as to print the document data which was checked-out by the check-out unit;
- a comparing unit configured to use the scan data obtained by executing the scan by the image processing apparatus and the analysis data stored in the analysis data storing unit, thereby comparing a degree of coincidence between the scan data and the analysis data in order to check-in the checked-out document data;
- a check-in error notifying unit configured to notify the image processing apparatus of an error of the check-in without uploading the scan data to the document management apparatus as document data to be checked-in when it is discriminated by the comparing unit that the degree of coincidence between the scan data and the analysis data is smaller than a preset threshold value;
- an uploading unit configured to transmit the scan data transmitted by the scan data transmitting unit of the image processing apparatus to the document management apparatus together with the information for specifying the document data to be checked-in when it is discriminated by the comparing unit that the degree of coincidence between the scan data and the analysis data is larger than the preset threshold value; and
- a check-in unit configured to check-in the document data which has completely been uploaded into the document management apparatus by the uploading unit.

3. The image processing apparatus according to claim 2, wherein when the check-out document selection accepting unit accepts, through the display unit, the selection of the document data to be checked-out from the document data displayed by the document list display unit, a selection of the document data in which the selection of the check-out has been performed by a user other than the user who has logged-in to the image processing apparatus is not accepted.

4. The image processing apparatus according to claim 2, further comprising a data format selection accepting unit configured to accept a selection of a data format at the time of scanning the document data to be checked-in in the case where the check-in instruction for updating the checked-out document data is accepted by the check-in instruction accepting unit through the display unit.

5. An information processing apparatus for communication with a document management apparatus which stores document data, the information processing apparatus being connectable to an image processing apparatus having a print unit for printing the document data and a display unit and comprising:
- a check-out discriminating unit configured to discriminate whether or not the document data in which a selection of a check-out has been accepted from a document list displayed on the display unit of the image processing apparatus is in a check-out state;
- a check-out unit configured to check-out the document data when it is determined by the check-out discriminating unit that the document data is not in the check-out state;
- a data analyzing unit configured to analyze the data so as to obtain contents of the document data checked-out by the check-out unit;
- an analysis data storing unit configured to store analysis data obtained as a result of the analysis of the data analyzing unit;
- an output instructing unit configured to issue an output instruction to the image processing apparatus so as to print the document data which was checked-out by the check-out unit;
- a comparing unit configured to use the scan data obtained by executing the scan by the image processing apparatus and the analysis data stored in the analysis data storing unit, thereby comparing a degree of coincidence between the scan data and the analysis data in order to check-in the checked-out document data; and
- a check-in error notifying unit configured to notify the image processing apparatus of an error of the check-in without uploading the scan data to the document management apparatus by the uploading unit as document data to be checked-in when it is discriminated by the comparing unit that the degree of coincidence between the scan data and the analysis data is smaller than a preset threshold value;
- an uploading unit configured to transmit scan data obtained by executing a scan by the image processing apparatus and information for specifying the document data in which a check-in instruction has been accepted by the image processing apparatus to the document management apparatus when it is discriminated by the comparing unit that the degree of coincidence between the scan data and the analysis data is larger than the preset threshold value; and a check-in unit configured to check-in the document data which has completely been uploaded into the document management apparatus by the uploading unit.

6. The information processing apparatus according to claim 5, wherein the check-out unit and the check-in unit send an instruction to rewrite a predetermined item of bibliography information of the document data stored in the document management apparatus, thereby executing an updating of a status of the document data.

7. The information processing apparatus according to claim 5, further comprising:

a document list obtaining unit configured to obtain a list of the document data stored in the document management apparatus from the document management apparatus;

a document list display screen forming unit configured to form a document list display screen for displaying the document data onto the display unit of the image processing apparatus when the document data is obtained by the document list obtaining unit; and a display control unit configured to control so that the document list display screen formed by the document list display screen forming unit is displayed onto the display unit of the image processing apparatus.

8. The information processing apparatus according to claim 5, further comprising:

a preview instruction accepting unit configured to accept a preview instruction of the document data by the display unit from the document list display screen displayed onto the display unit of the image processing apparatus;

a document data obtaining unit configured to obtain the document data accepted by the preview instruction accepting unit from the document management apparatus;

a temporary storing unit configured to temporarily store the document data obtained by the document data obtaining unit; and a preview display screen forming unit configured to form a preview display screen of the document data to be displayed onto the display unit of the image processing apparatus by using the document data stored in the temporary storing unit.

9. The information processing apparatus according to claim 5, wherein when the check-in of the document data is executed by the check-in unit, the document data is updated as latest document data of the document data in which the check-in instruction has been accepted by the image processing apparatus, and a version of the stored document data is rewritten as document data before the latest document data is updated.

10. The information processing apparatus according to claim 5, further comprising a check-out abandoning unit configured to execute an abandonment of the check-out in order to return a status of the document data checked-out by the check-out unit to an original status.

11. The information processing apparatus according to claim 5, further comprising an analysis data deleting unit configured to delete the analysis data used in the comparing unit when the check-in in the document management apparatus has been completed in the check-in unit.

12. A method carried out in a document management system including an information processing apparatus for communication with a document management apparatus which stores document data, and further including an image processing apparatus having a print unit for printing the document data and a display unit, wherein in the image processing apparatus, the method comprises:

displaying a list of the document data stored in the document management apparatus onto the display unit;

accepting, through the display unit, a selection of the document data to be checked-out from the displayed document data;

receiving the accepted document data from the information processing apparatus and printing a document through the print unit;

accepting, through the display unit, a check-in instruction for updating the checked-out document data;

executing a scan of the printed document so as to update the document data in which the check-in instruction has been accepted; and transmitting information for specifying the document data in which the check-in has been instructed and scan data obtained by executing the scan to the information processing apparatus, and wherein in the information processing apparatus the method comprises:

discriminating whether or not the document data accepted in the first accepting is in a check-out state;

checking-out the document data when it is determined that the document data is not in the check-out state;

analyzing the data so as to obtain contents of the checked-out document data;

storing analysis data obtained as a result of the analysis;

issuing an output instruction to the image processing apparatus so as to print the checked-out document data;

comparing a degree of coincidence between the scan data obtained by executing the scan by the image processing apparatus and the stored analysis data in order to check-in the checked-out document data;

notifying the image processing apparatus of an error of the check-in without uploading the scan data to the document management apparatus as document data to be checked-in when it is discriminated that the degree of coincidence between the scan data and the analysis data is smaller than a preset threshold value;

transmitting the scan data from the image processing apparatus to the document management apparatus together with the information for specifying the document data to be checked-in when it is discriminated that the degree of coincidence between the scan data and the analysis data is larger than the preset threshold; and checking-in the document data which has completely been transmitted to the document management apparatus.

13. A non-transitory computer-readable storage medium storing a computer program for causing a computer to execute the method according to claim 12.

14. A method carried out in an image processing apparatus connectable to an information processing apparatus for communication with a document management apparatus which stores document data, the image processing apparatus including a print unit for printing the document data and a display unit; the method comprising:

displaying a list of the document data stored in the document management apparatus onto the display unit;

accepting, through the display unit, a selection of the document data to be checked-out from the displayed document data;

receiving the accepted document data from the information processing apparatus and printing a document through the print unit;

accepting, through the display unit, a check-in instruction for updating the checked-out document data;

executing a scan of the printed document so as to update the document data in which the check-in instruction has been accepted; and transmitting information for specifying the document data in which the check-in has been instructed and scan data obtained in the executing to the information processing apparatus, and wherein the information processing apparatus executes the steps of:

discriminating whether or not the document data accepted in the first accepting is in a check-out state;

checking-out the document data when it is determined that the document data is not in the check-out state;

analyzing the data so as to obtain contents of the checked-out document data;

storing analysis data obtained as a result of the analysis;

issuing an output instruction to the image processing apparatus so as to print the checked-out document data;

comparing a degree of coincidence between the scan data obtained by executing the scan by the image processing apparatus and the stored analysis data in order to check-in the checked-out document data;

notifying the image processing apparatus of an error of the check-in without uploading the scan data to the document management apparatus as document data to be checked-in when it is discriminated that the degree of coincidence between the scan data and the analysis data is smaller than a preset threshold value;

transmitting the scan data transmitted from the image processing apparatus to the document management apparatus together with the information for specifying the document data to be checked-in when it is discriminated that the degree of coincidence between the scan data and the analysis data is larger than the preset threshold value; and checking-in the document data which has completely been transmitted to the document management apparatus.

15. A non-transitory computer-readable storage medium storing a computer program for causing a computer to execute the method according to claim 14.

16. A method carried out in an information processing apparatus for communication with a document management apparatus which stores document data, the information processing apparatus being connectable to an image processing apparatus having a print unit for printing the document data and a display unit, the method comprising:

discriminating whether or not the document data in which a selection of a check-out has been accepted from a document list displayed on the display unit of the image processing apparatus is in a check-out state;

checking-out the document data when it is discriminated that the document data is not in the check-out state;

analyzing the data so as to obtain contents of the checked-out document data;

storing analysis data obtained as a result of the analysis;

issuing an output instruction to the image processing apparatus so as to print the checked-out document data;

comparing a degree of coincidence between the scan data obtained by executing the scan by the image processing apparatus and the stored analysis data in order to check-in the checked-out document data;

notifying the image processing apparatus of an error of the check-in without uploading the scan data to the document management apparatus as document data to be checked-in when it is discriminated that the degree of coincidence between the scan data and the analysis data is smaller than a preset threshold value;

transmitting scan data obtained by executing a scan in the image processing apparatus and information for specifying the document data in which a check-in instruction has been accepted by the image processing apparatus to the document management apparatus when it is discriminated that the degree of coincidence between the scan data and the analysis data is larger than the preset threshold value; and checking-in the document data which has completely been uploaded into the document management apparatus.

17. A non-transitory computer-readable storage medium storing a computer program for causing a computer to execute the method according to claim 16.

\* \* \* \* \*